Patented Aug. 14, 1951

2,563,832

UNITED STATES PATENT OFFICE 2,563,832

INSECT REPELLENTS

Marshall Gates, Bryn Mawr, Pa., assignor to the United States of America as represented by the Secretary of the Army No Drawing. Application January 10, 1949,
Serial No. 70,139

6 Claims. (Cl. 167—30)

(Granted under the act of March 3, 1883, as
amended April 30, 1928; 370 O. G. 757)

The invention described herein, if patented, may be manufactured and used by or for the Government for governmental purposes, without the payment to me of any royalty thereon.

This invention relates to insect repellents.

I have found that the application of the ethyl ester of alpha-methyl-beta-hydroxy-beta-phenyl propionic acid, a compound having the structural formula

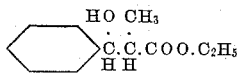

to the human skin or to a fabric affords effective protection against insect bites, by repelling insects, particularly Aedes aegypti and Anopheles quadrimaculatus.

A number of tests to measure the repellency of the ethyl ester of alpha-methyl-beta-hydroxy-beta-phenyl propionic acid against Aedes aegypti was conducted by smearing the compound on the arms of test personnel, who then thrust their arms into cages containing Aedes aegypti. The arms were exposed for 30-minute intervals at 3 minutes each until the first insect bite.

Tests to measure the repellency of the ethyl ester of alpha-methyl-beta-hydroxy-beta-phenyl propionic acid impregnated fabrics against Aedes aegypti were conducted by uniformly impregnating mercerized cotton hose with the compound at a rate equivalent to 3.3 gms. per sq. ft., drawing the dried hose over the arms of test personnel, who then thrust their covered arms into cages containing Aedes aegypti for 1 to 2 minutes. If no bites or less than 5 bites were received, the tests were repeated each successive day until 5 or more bites during one exposure were received.

It was found that the application of the ethyl ester of alpha-methyl-beta-hydroxy-beta-phenyl propionic acid affords protection against the Aedes aegypti for an average of 231 minutes. Against Anopheles quadrimaculatus, an average repellency time of 58 minutes was noted in analogous tests.

It was found that fabric impregnated with the ethyl ester of alpha-methyl-beta-hydroxy-beta-phenyl propionic acid remained repellent to Aedes aegypti for over 10 successive days.

For ease of application to the skin, the ethyl ester of alpha-methyl-beta-hydroxy-beta-phenyl propionic acid may be incorporated in a suitable inert liquid or solid carrier such as mineral oil, alcohol, petrolatum, etc. For ease and uniformity of application to the fabric, the ethyl ester of alpha-methyl-beta-hydroxy-beta-phenyl propionic acid may be applied to the fabric in an inert solvent, such as alcohol, ether, etc.

Having thus described my invention, I claim:

1. An insect-repellent fabric comprising fabric impregnated with the ethyl ester of alpha-methyl-beta-hydroxy-beta-phenyl propionic acid.

2. An insect repellent composition comprising the ethyl ester of alpha-methyl-beta-hydroxy-beta-phenyl propionic acid in a non-gaseous inert organic carrier.

3. An insect repelling composition comprising the ethyl ester of alpha-methyl-beta-hydroxy-beta-phenyl propionic acid in alcohol.

4. An insect repelling composition comprising the ethyl ester of alpha-methyl-beta-hydroxy-beta-phenyl propionic acid in ether.

5. An insect repellent composition comprising the ethyl ester of alpha-methyl-beta-hydroxy-beta-phenyl propionic acid in oil.

6. An insect repellent composition comprising the ethyl ester of alpha-methyl-beta-hydroxy-beta-phenyl propionic acid in petrolatum.

MARSHALL GATES.

REFERENCES CITED

The following references are of record in the file of this patent:

UNITED STATES PATENTS

| Number | Name | Date |
|---|---|---|
| 2,400,006 | Jones et al. | May 7, 1946 |

OTHER REFERENCES

Chemical Abstracts, vol. 35, page 6250 (Ethyl-Beta-Phenyl-Beta-Hydroxypropionate), 1941.

Linduska et al.: "Flea Repellents for Use on Clothing," Journal of Economic Entomology, December 1946, pp. 767–769.

OSRD, Bimonthly Progress Report No. 22, section 1, period ending February 28, 1945, particularly page 13.